United States Patent
Taracko

(10) Patent No.: US 8,646,208 B2
(45) Date of Patent: Feb. 11, 2014

(54) SELECTABLE-MODE DOOR ASSEMBLY AND RELATED METHOD

(75) Inventor: Matt Taracko, Raymond, OH (US)

(73) Assignee: Honda Motor Co., Ltd, Tokyo (JP)

( * ) Notice: Subject to any disclaimer, the term of this patent is extended or adjusted under 35 U.S.C. 154(b) by 878 days.

(21) Appl. No.: 12/035,729

(22) Filed: Feb. 22, 2008

(65) Prior Publication Data

US 2009/0212590 A1 Aug. 27, 2009

(51) Int. Cl.
*E05D 15/22* (2006.01)
(52) U.S. Cl.
USPC ................................ 49/155; 49/158; 49/360
(58) Field of Classification Search
USPC ............. 49/25, 152, 153, 154, 155, 156, 158, 49/360, 502; 296/146.11, 146.12
See application file for complete search history.

(56) References Cited

U.S. PATENT DOCUMENTS

| | | | | |
|---|---|---|---|---|
| 3,834,081 A | * | 9/1974 | Catlett | 49/360 |
| 4,135,760 A | * | 1/1979 | Grossbach | 296/155 |
| 4,976,488 A | * | 12/1990 | Asai et al. | 296/155 |
| 6,183,039 B1 | | 2/2001 | Kohut et al. | |
| 6,213,535 B1 | * | 4/2001 | Landmesser et al. | 296/146.12 |
| 6,234,565 B1 | | 5/2001 | Bryant et al. | |
| 6,447,054 B1 | * | 9/2002 | Pietryga et al. | 296/202 |
| 6,499,794 B1 | | 12/2002 | Kansier et al. | |
| 6,793,268 B1 | * | 9/2004 | Faubert et al. | 296/146.12 |
| 7,000,977 B2 | | 2/2006 | Anders | |
| 7,438,346 B1 | * | 10/2008 | Breed | 296/146.4 |
| 7,591,504 B1 | * | 9/2009 | Schrader | 296/202 |
| 2003/0218358 A1 | | 11/2003 | Hahn | |
| 2007/0120395 A1 | * | 5/2007 | Geyrhofer et al. | 296/146.11 |
| 2009/0085720 A1 | * | 4/2009 | Kurpinski et al. | 340/5.64 |
| 2010/0181797 A1 | * | 7/2010 | Hitomi | |
| 2011/0031055 A1 | * | 2/2011 | Rajasingham | 180/271 |

FOREIGN PATENT DOCUMENTS

EP          1867827 A2 * 12/2007
JP       2008202233 A  *  9/2008

* cited by examiner

*Primary Examiner* — Jerry Redman
(74) *Attorney, Agent, or Firm* — Mark E. Duell; Emerson Thomson Bennett, LLC

(57) ABSTRACT

The present invention generally relates to selectable-mode vehicle door assemblies. Some embodiments include door assemblies that are capable of operating in a sliding mode, and in a swinging mode according to user selection. Some embodiments can include one or more doorframes that can be selectably engaged in a swing mode or a slide mode. Other embodiments generally relate to methods associated with selectable-mode door assemblies.

4 Claims, 3 Drawing Sheets

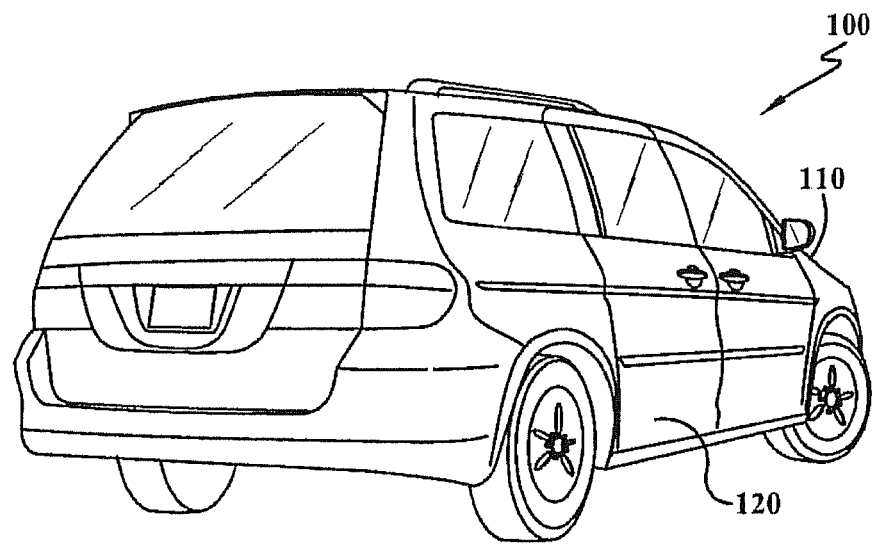
FIG. 1A
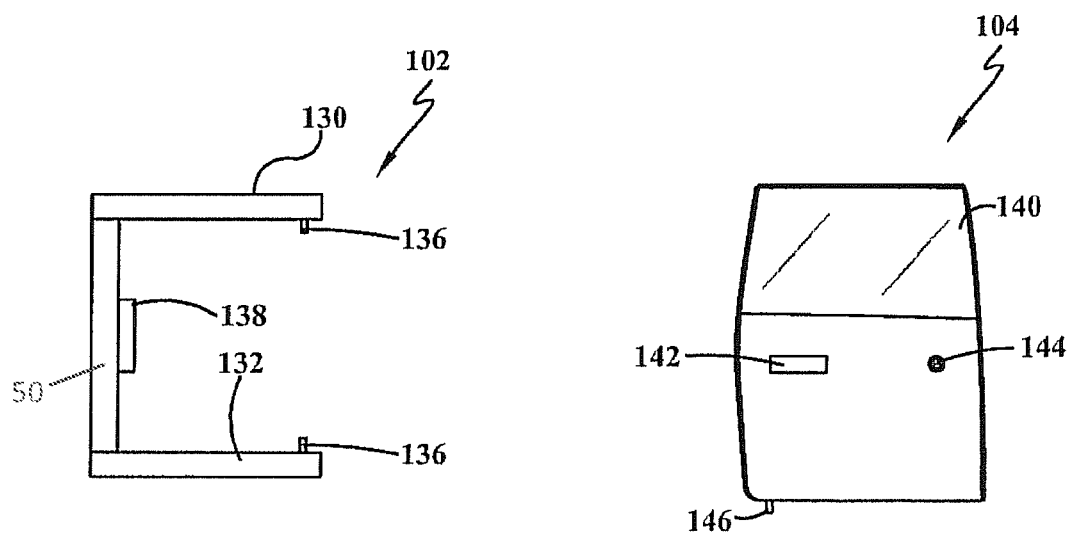
FIG. 1B  FIG. 1C

SELECTABLE-MODE DOOR ASSEMBLY AND RELATED METHOD

I. BACKGROUND OF THE INVENTION

A. Field of Invention

The present invention generally relates to vehicle door assemblies and related methods. Some embodiments include selectable-mode door assemblies where a user can selected between a plurality of door operating modes.

B. Description of the Related Art

Swing-mode door assemblies are known in the art. Some prior door assemblies consist of door assemblies that are adapted to open and close in a swinging mode. For example, conventional car doors are often operated in swing mode. Alternatively, slide-mode door assemblies are also known in the art. For example, side doors of vans and minivans are often constructed to operate in a sliding mode, whereby the door opens and closes by sliding on one or more tracks disposed in a doorframe. However, there is a gap in the art inasmuch as the art does not include door assemblies that can be operated selectively in either a sliding mode or a swinging mode.

The present invention provides door assemblies that are capable of operating in a plurality of modes, including a sliding mode and a swinging mode, according to user selection. The present invention also provides methods related to selectable-mode door assemblies.

II. SUMMARY OF THE INVENTION

Some embodiments of the present invention relate to a selectable-mode door assembly, comprising: a door member; a doorframe member selectably affixed to the door member in a swinging relation and in a sliding relation; at least one selectable hinge member adapted to movably affix the door to the doorframe in a swinging relation; at least one selectable rail member adapted to movably affix the doorframe to a vehicle in a sliding relation; and a means for selecting between the swinging relation and the sliding relation.

Other embodiments relate to a selectable-mode door assembly, comprising: an outer doorframe member; an inner doorframe member selectably affixed to the outer doorframe member in a sliding relation; a door member selectably affixed to the inner doorframe member in a swinging relation; at least one selectable hinge member adapted to movably affix the door member to the inner doorframe member in a swinging relation; at least one selectable rail member adapted to movably affix the inner doorframe member to the outer doorframe member in a sliding relation; and a means for selecting between the swinging relation and the sliding relation.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1A is a drawing of an embodiment having a door member that is capable of opening in either of two alternative modes.

FIG. 1B is a drawing of an inner doorframe member.

FIG. 1C is a drawing of a door member.

IV. DETAILED DESCRIPTION OF THE INVENTION

Figure 2A:
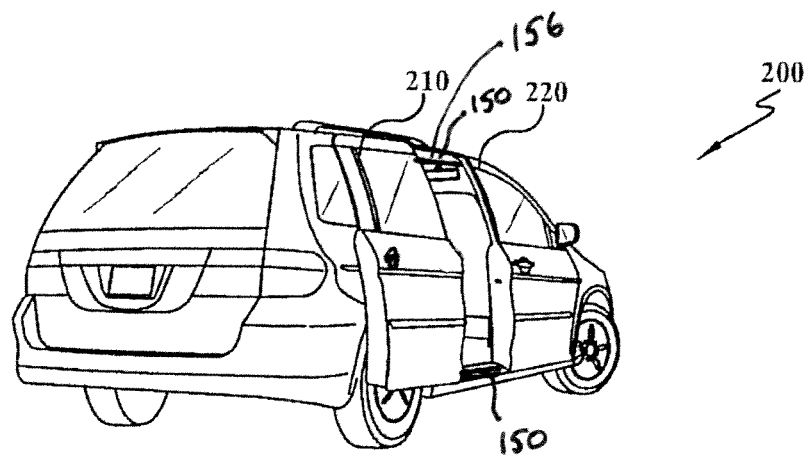
FIG. 2A is a drawing of an embodiment having the door opened in a slide mode.

The present invention generally relates to vehicle door assemblies and related methods. Some embodiments include selectable-mode vehicle door assemblies that are capable of sliding open, and swinging open according to user selection. Such embodiments also include a means for selecting a sliding mode or a swinging mode.

Some embodiments include a doorframe member and a door member, adapted to be received by the doorframe member. In some embodiments, the door is selectably affixed to the doorframe and therefore the door can slide on the doorframe in order to open and close, or to swing on the same doorframe to open and close according to user selection. Such embodiments include a means for selecting between a slide mode and a swing mode. According to one embodiment, in slide mode the door slides on one or more rails disposed in or on the doorframe. However, in swing mode the door can disengage from the one or more tracks, and thereby be free to rotate about one or more pivot points defining a swinging relation between the door and doorframe.

Some embodiments include a first doorframe adapted to receive a door, and to move with the door as a unit in a sliding relation to a second doorframe. In such embodiments, the door is selectably affixed to the first doorframe in a swinging relation. Therefore, the door is adapted to swing open and shut relative to the first doorframe when a swing mode is selected. Furthermore, the first doorframe is selectably affixed to the second door frame in a sliding relation. Therefore, the combination of the door and the first doorframe is adapted to slide as a unit on the second doorframe when a sliding mode is selected.

According to one embodiment, a vehicle door assembly includes a door member, and an inner doorframe member. The door member is affixed to the inner doorframe member in a swinging relation. According to this embodiment, the door is adapted to rotate about an axis at or near one side of the door, whereby the door swings out and away from the inner doorframe, defining an open orientation. Similarly, the door is adapted to swing into the inner doorframe, defining a closed orientation. In some embodiments, the axis about which the door swings is selectable. For example, in one embodiment, a first selectable axis of rotation can be at or near the right side of the door, while a second selectable axis of rotation is disposed at or near the left side of the door.

In some embodiments, the door may include one or more latches for releasably maintaining the door in a closed orientation relative to the inner doorframe. For example, in one embodiment, the door may include a latch adapted to receive a latchable member disposed on the inner doorframe. In this embodiment, the latch receives and engages the latchable member and thereby holds the door in a closed orientation. Furthermore, the latch includes a releasing means for releasing the latch, and freeing the door thereby allowing the door to swing open.

Some embodiments include an outer doorframe adapted to receive an inner doorframe. In some embodiments the outer doorframe remains stationary relative to the vehicle frame, and in some embodiments the outer doorframe can comprise a portion of the vehicle frame. The inner doorframe can be attached to the outer doorframe in a sliding relation. Accordingly, the inner doorframe can slide on the outer doorframe, defining an open orientation and a closed orientation. In such embodiments, the door member can be attached to the inner doorframe in a releasably fixed relation. For example, a door and inner doorframe can be held in a closed orientation within an outer doorframe, by a latch for instance. According to such embodiments, the door and inner doorframe are adapted to slide as a unit on the outer doorframe. Furthermore, some embodiments can include a means for holding the inner doorframe in a closed orientation relative to the outer doorframe. In some embodiments the holding means can include, without limitation, a latch. Some embodiments can also include a means for releasing the holding means. Accordingly, if the holding means is a latch, then a releasing means can be any suitable device for releasing a latch.

Some embodiments can optionally include a motorized means for opening and/or closing a door and/or door/frame combination. For example, one embodiment can include a motor adapted to open a door upon receiving a "go" signal, for instance from a remote device, push-button, handle or lever. In one embodiment, an operator can actuate the motor by pushing a button. In another, the operator can actuate the motor by pulling a handle or lever. Thus, in some embodiments, the motor operates without additional force applied by the user and in other embodiments the motor operates as an assist to the user. Furthermore, in some embodiments the motor is in mechanical communication with the inner doorframe and the outer doorframe, and is adapted to slide the inner doorframe on the outer doorframe. In other embodiments, the motor is in mechanical communication with the door member and inner doorframe, and is adapted to swing the door member away from the inner doorframe or into the inner doorframe.

Referring now to the drawings wherein the showings are for purposes of illustrating embodiments of the invention only and not for purposes of limiting the same, FIG. 1A is a general drawing showing an embodiment 100 comprising a dual-mode door 120 installed on an automobile 110. FIG. 1B is a drawing of an embodiment comprising an inner doorframe 102. As shown, the inner doorframe 102 comprises an upper rail or track 130, and a lower rail or track 132 for slidably engaging with an outer doorframe. FIG. 1B shows the inner door frame to be single, unitary and substantially u-shaped. In this embodiment, the inner doorframe also comprises a pair of hinge pins 136 for rotatably mating with a door member 104. Accordingly, the door member 104 is adapted to swing about the rotatable mating points, comprising hinge pins 136. Furthermore, the inner doorframe member 102 includes a latchable member 138 for mating with a latch located on a door member. The inner doorframe 102 can also include a latch for mating with a latchable member disposed on the outer doorframe, and adapted to hold the inner doorframe 102 in a closed orientation relative to the outer doorframe.

FIG. 1C is a drawing showing an embodiment comprising a door member 104. The door member 104 can include one or more hinges 146 adapted to mate with the hinge pins 136 of the inner doorframe member 102. Thus, the door member 104 is capable of opening and closing by rotating on the hinges 146 and hinge pins 136. In this embodiment, the door member 104 also comprises a handle 142 for opening and closing the door. The handle 142 is also adapted to actuate a latch release thereby enabling an operator to release a door latch and open the door in a swinging mode. This embodiment further comprises a push-button 144 for actuating a motorized assist capable of opening the door for an operator.

Figure 2B:
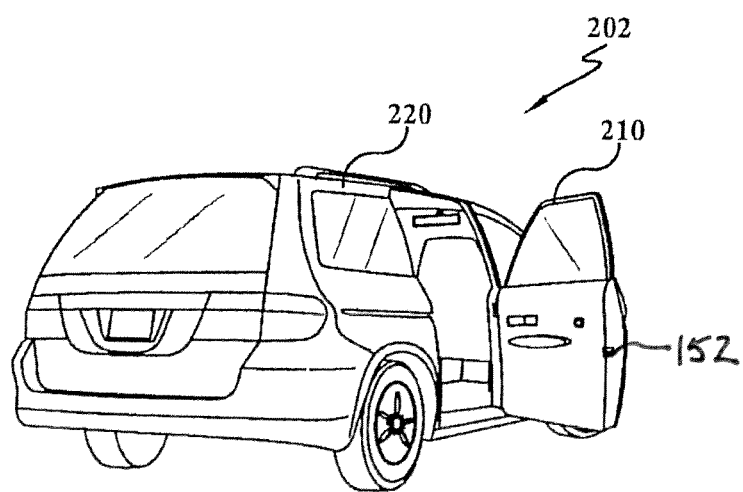
FIG. 2B is a drawing of an embodiment having the door opened in a swing mode.
Figure 3:
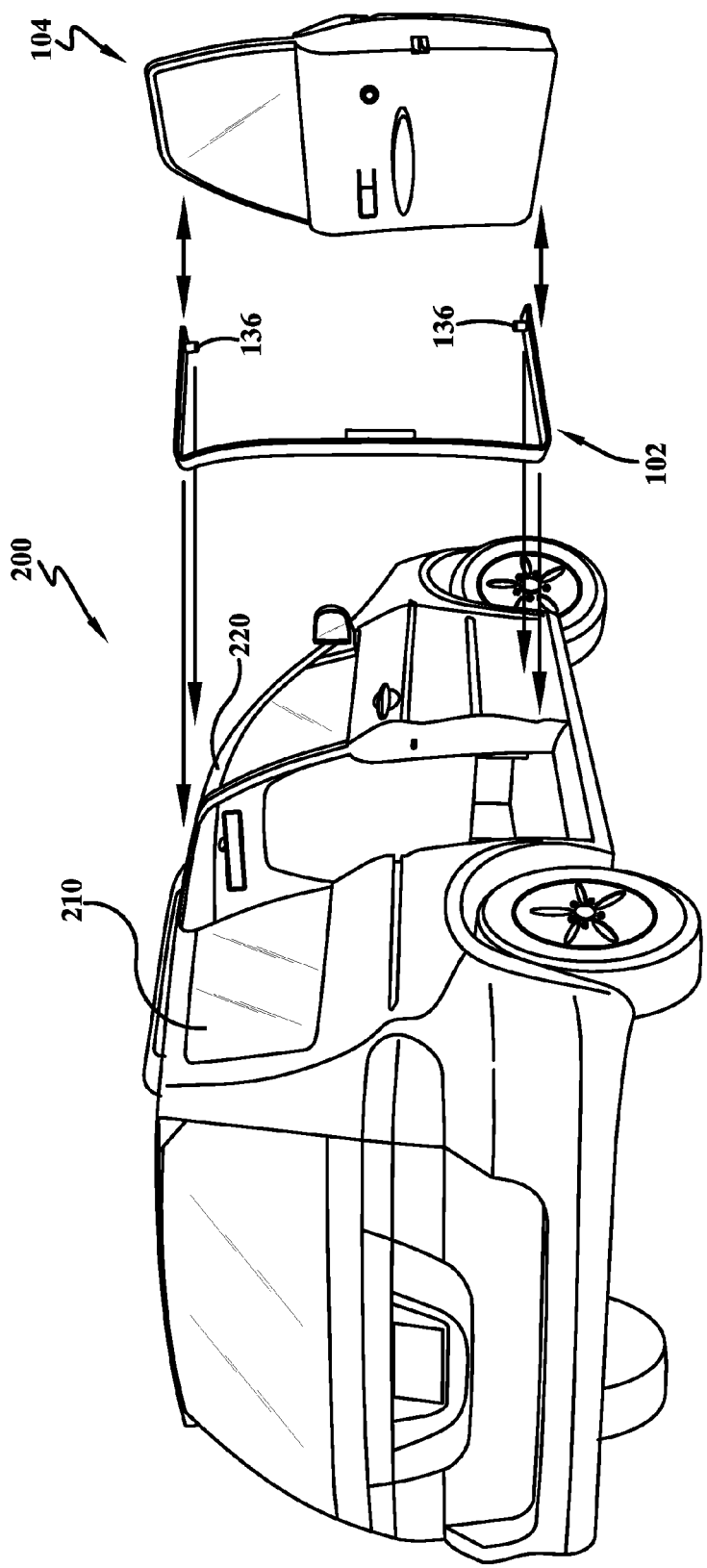
FIG. 3 is an exploded view showing the interconnection among various components of the exemplary embodiment.

FIG. 2A is a drawing showing an embodiment 200 having a door 210 in a sliding relation with, and in an opened orientation relative to, a door member 220. FIG. 2B is a drawing of an embodiment 202 having the door member 210 in a swinging relation with, and opened orientation relative to, a door member 220. FIGS. 2A and 2B show alternative configurations of the same vehicle. According to user selection, the vehicle can operate in sliding mode 200 or in swinging mode 202.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. A vehicle comprising:
a vehicle frame; and,
a selectable-mode door assembly comprising:
an outer doorframe that is fixedly attached to the vehicle frame;
a single, unitary and substantially U-shaped inner doorframe attached in sliding relation to the outer doorframe;
a door that is pivotally connected to a hinge pin on the u-shaped inner doorframe;
wherein the selectable-mode door assembly is adjustable into: (1) a sliding mode where the inner doorframe and the door are slideable as a unit with respect to the outer doorframe and (2) a swing mode where the door is pivotal with respect to the inner doorframe.

2. The vehicle of claim 1 wherein:
the inner doorframe includes a midsection and upper and lower rails that respectively extend from opposite ends of the midsection.

3. The vehicle of claim 2 further comprising:
at least one hinge pin projecting from one of the upper and lower rails toward the other of the upper and lower rails.

4. The vehicle of claim 2 further comprising:
first and second hinge pins, each projecting from one of the upper and lower rails toward the other of the upper and lower rails.

* * * * *